Aug. 2, 1927.
W. J. HAWKINS
1,637,820
AUTOMATIC HEATER
Filed Nov. 1, 1926
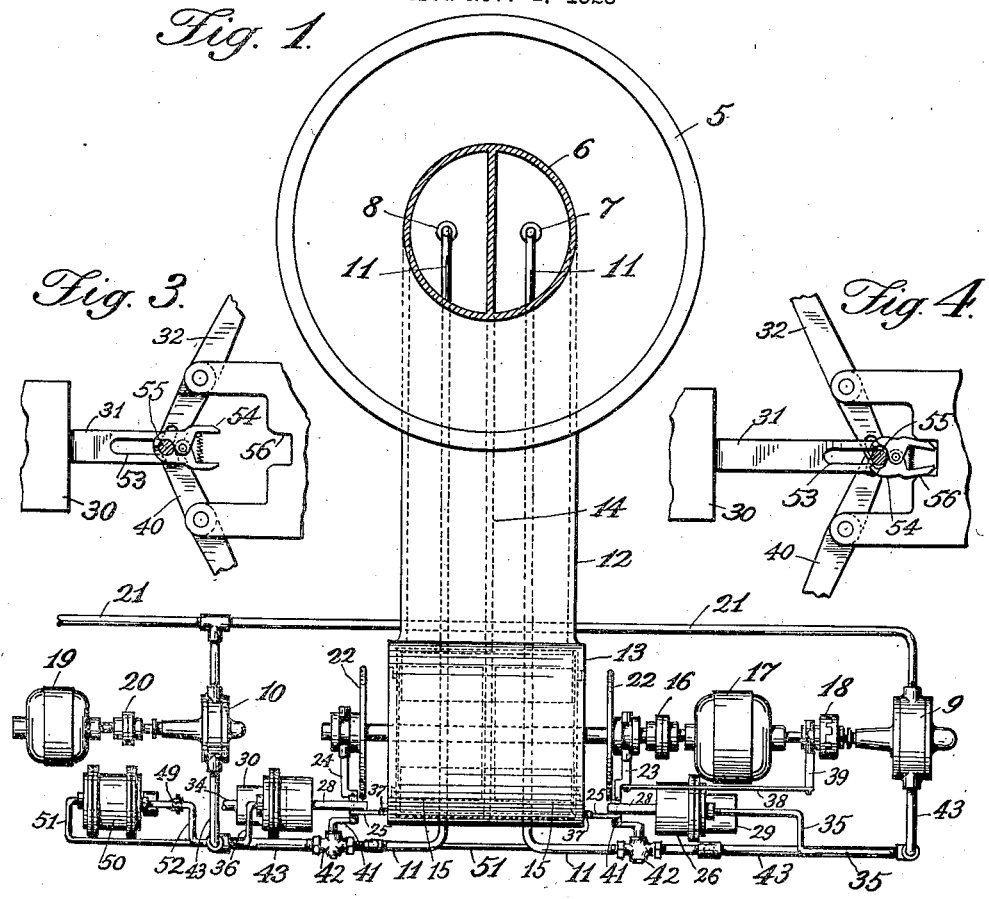
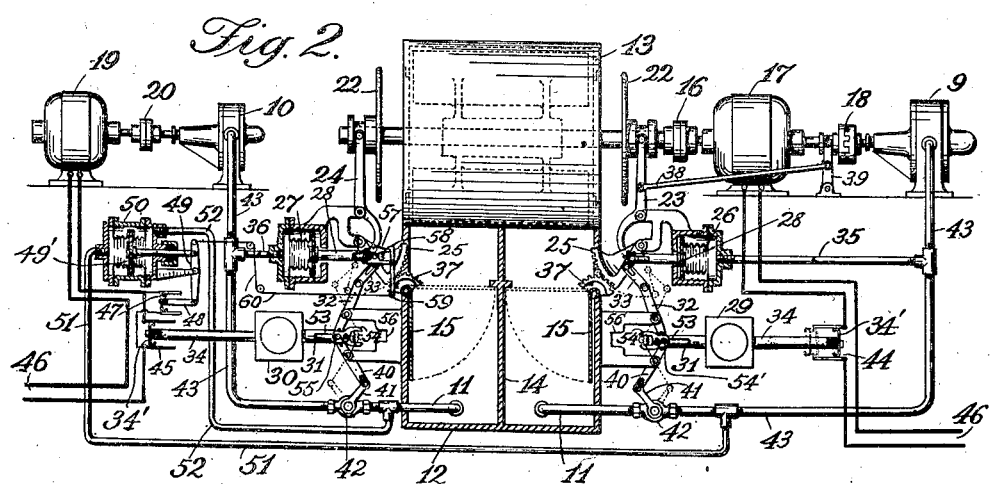
INVENTOR,
Welford J. Hawkins
BY
Sydney Prescott
ATTORNEY Patented Aug. 2, 1927.

1,637,820

UNITED STATES PATENT OFFICE.

WILFORD J. HAWKINS, OF MONTCLAIR, NEW JERSEY, ASSIGNOR TO AMERICAN MACHINE & FOUNDRY COMPANY, A CORPORATION OF NEW JERSEY.

AUTOMATIC HEATER.

Application filed November 1, 1926. Serial No. 145,493.

This invention relates to an improvement in an automatic heater, its main object being the production of an automatically controlled heating apparatus comprising a plurality of units, the main unit being used under ordinary temperature conditions, and one or more of the others being used in addition thereto under extreme temperature conditions.

A further object is to so arrange the units that in the event that the main one gets out of order, it automatically stops operation and one or more of the others automatically start up in its place; the latter therefore serve the double purpose of furnishing additional heat when required in extreme cold weather, and in acting as a reserve unit when the main unit is out of order in moderate weather.

Continuity of service is achieved by means of bellows diaphragms controlled by pressure derived from the oil pumps of the units. Automatic control and economy, in using one or more additional units under extreme conditions, is accomplished by means of thermostats and by the action of the bellows diaphragms before referred to.

With these and other objects not specifically mentioned in view, the invention consists in certain constructions and combinations which will be hereinafter fully described and then specifically set forth in the claims hereunto appended.

In the accompanying drawings, in which like characters of reference indicate the same or like parts, Fig. 1 is a plan view of an apparatus constructed in accordance with the invention, showing the arrangement and interconnection of the component parts; Fig. 2 is an elevation showing the connection of the different working units with the control devices; and Figs. 3 and 4 are views on an enlarged scale, showing the arrangement of one of the thermostat controls in two positions.

In carrying the invention into effect, there is provided a furnace constituting a part of a heating apparatus of any suitable form, a blower, a conduit leading from said blower to said furnace, a plurality of pumps and operative connections for forcing oil to said furnace, and means for automatically controlling the number of pumps in action in accordance with predetermined conditions whether of rise or fall of temperature, or of failure of one of the pumps to function properly. In the best constructions contemplated, the furnace is divided into a plurality of chambers into each of which one of said pumps forces oil; said conduit is divided into a plurality of ducts each of which leads to one of the furnace chambers; said means includes operative connections and a plurality of valves controlling passage of air through said conduit, a plurality of regulating valves associated with the operative connections of the pumps, a plurality of pump starting devices, and a plurality of independently-operative actuating devices for the operative connections of said means. The above named means, parts and devices may be widely varied in construction within the scope of the claims because the specific structure selected to illustrate the invention is but one of many possible concrete embodiments of the same. The invention therefore is not to be restricted to the precise details of the structure shown and described.

Referring to the drawings, 5 indicates a furnace having a divided fire pot 6, provided with burners 7 and 8 to which the fuel oil is supplied from the main pump 9 and the auxiliary pump 10 by pipes 11 passing through an air conduit 12 communicating with a centrifugal blower 13. The conduit 12 is provided with a partition 14 which divides it into two ducts, each supplying air to one of the burners 7 and 8. The blower 13, which discharges its air into the two ducts of the conduit 12 through openings controlled by swinging outlet valves 15, is connected, through a shaft coupling 16, with a motor 17 which also drives the main pump 9 through a clutch 18. The oil pipe 21 supplies the pumps 9 and 10.

The inlet valves 22 of the blower 13 are operated by shift levers 23 and 24 which move with the gear segments 25, independently controlled by bellows diaphragms 26 and 27 through operating rods 28, and by thermostats 29 and 30, through operating rods 31, levers 32, and links 33. At their junction with the rod 28, the segments 25 and the curved ends of the shift levers 23 and 24 are slotted to permit their relative motion. The thermostats 29 and 30 also actuate the rods 34 which may be rear extensions of the rods 31.

The bellows diaphragm 26 is under pressure derived from the pump 9 by means of a pipe connection 35, and the bellows diaphragm 27 is under pressure derived from the pump 10 by a pipe connection 36. The diaphragms 26 and 27 are expansible under pressure, thereby pushing out the rods 28, and self collapsible upon cessation of the pressure.

The gear segments 25 mesh with segments 37 attached to the fulcrum shafts of the outlet valves 15 of the blower 13. The shift lever 23 of the right hand inlet valve 22 of the blower 13, by means of a rod 38, is connected to the shift lever 39 of the clutch 18 operating the pump 9.

The actuating rods 31 of the thermostats 29 and 30, through levers 40, are also connected with the cranks 41 of the flow regulating valves 42 in the oil feeding pipe line 43.

The rear actuating rods 34 of the thermostats 29 and 30 carry the insulated contact bridges 34' of the starting switches 44 and 45 of the motors 17 and 19, respectively, the wires 46 being connected to the electric supply circuit. For simplicity, only one contact bridge is shown on each of the rods 34, while preferably two are used side by side, one for each of the two wires 46, thus constituting a double pole starting switch.

The motor 19 driving the pump 10 has, connected in parallel with the main starting switch 45, a second starting switch the contact bridge 47 of which is mounted on a link 48 connected by a lever 49 to the actuating rod 49' of the differential pressure device 50, one side of which, by means of a pipe connection 51 is under pressure derived from the pump 9, and the other side, by means of a pipe 52, is under pressure derived from the pump 10.

The actuating rods 31 of the thermostats 29 and 30 are provided with slots 53, in the outer extremity of which the slotted ends of the levers 32 and 40 are held by spring clamps 54 (Figs. 3 and 4) so arranged that, in the outermost position of the rods 31, corresponding to the upper temperature limits of the thermostats 29 and 30, the pivot pin 55 is released by a stop 56, permitting the levers 32 and 40 to return to their starting position in case the lever 32 is actuated by the diaphragm 26, or 27, through the rod 28, the segment 25 and the link 33. If, on the other hand, the rod 31 moves back from its outermost position through the action of the thermostat 29, or 30, and no action of the diaphragm 26, or 27, has taken place, the clamp 54 again closes upon the pivot pin 55 and holds the levers 32 and 40 in their former position at the outer end of the slot 53. The rods 28 of the diaphragms 26 and 27 are provided with slots so that the segments 25 can be moved by the action of the thermostats 29, or 30, without disturbing the diaphragms 26, or 27. Likewise, slots in the links 33 permit movement of the segments 25 by the diaphragms without disturbing the thermostats.

The actuating rod 28 of the diaphragm 27 is, on its free end, provided with a clamp 57, similar in construction to the clamps 54 on rods 31, but having a trip catch 58 pivoted on one of its members and engaging with the other, the arm 59 of the catch 58 being controlled by a cord 60 connected to the lever 49 of the differential pressure device 50. The clamp 57, in its normal position, is held open by the catch 58 so that the slot in the rod 28 will permit the rod 28 to move without affecting the position of the segment 25 and shift lever 24. Only when the pump 10 is started by the action of the differential pressure device 50, the movement of the lever 49, through the cord 59, causes the catch 58 to disengage and the clamp 57 to close around the pivot pin connecting the segment 25 and the lever 24 to the rod 28, and then a subsequent forward motion of the rod 28, due to the action of the diaphragm 27, will cause a corresponding motion of the segment 25 and lever 24, and, consequently, of the outlet valve 15, the inlet valve 22, and the regulating valve 42.

The apparatus is so assembled that, in the non-operative position, with the diaphragms unexpanded and the thermostats at high temperature setting, the various operating levers are in their dotted positions in Fig. 2, the regulating valves 41, the outlet valves 15, and the inlet valves 22 are closed, and the switches 44, 45 and 47 are open.

The operation of the automatic heater is as follows: The thermostats 29 and 30 are set to operate between the desired temperature limits, say thermostat 29 from 60° down to 30°, and thermostat 30 from 30° to 0°, so that the pump 9 and the burner 7 will supply the necessary heat at moderate temperatures, between 60° and 30°, and the pump 10 and the burner 8 will be used as auxiliary units, in addition to the pump 9 and burner 7, in extreme weather, below 30°. Above 60°, the switches 44 and 45, and the clutch 18 are open, and all valves are closed, the rods 31 and 34 of the thermostat 29 being in their extreme position to the left, and the rods 31 and 34 of the thermostat 30 in their extreme position to the right. Therefore, the pumps 9 and 10 are off, and there is no pressure in the pipes 35 and 36, the diaphragms 26 and 27 are unexpanded and the rods 28 are in their innermost position, the outer ends of their slots engaging with the pivot pins in the segments 25 which, at and above 60°, are in their outermost positions, nearest to the diaphragms. At 60°, the thermostat 29 begins to act; the contact bridge on the rod 34, which at higher temperatures was positioned outside of the switch 44, now enters the same, thereby starting the motor 17;

and the motion of the rod 31, through the lever 32, link 33, segment 25, lever 23, rod 38 and shift lever 39, sets the clutch 18, thereby starting the pump 9. Pressure created in the pipes 43 and 35 by the working of the pump 9 expands the diaphragm 26, moving the rod 28 to the left, so that the pivot pin in the segment 25, which with the other control levers is still in the dotted line position shown in Fig. 2, now is at the right hand end of the slot in the rod 28 and is free to move toward the left. When the temperature falls below 60°, the rods 33 and 34 of thermostat 29 move to the right, with decreasing temperature gradually opening, through the levers 32 and 40, the air valves 15 and 22, and the regulating valve 42, until, at 30°, when the operating levers on the right half of Fig. 2 are in the positions shown in full lines, and the pivot pin in the segment 25 has traveled to the left hand end of the slot in the rod 28, the valves of the pump 9 are wide open. At this temperature, 30°, the thermostat 30 commences to act, first, by closing the switch 45, thus starting the motor 19 and the pump 10, and then, after the rod 28 of the diaphragm 27 has moved to the right due to the pressure now in the pipe 36, by gradually opening the regulating valve 42 and air valves 15 and 22 of the pump 10, until, at 0°, they are wide open and remain so for any further decrease of temperature.

On rising temperature, the above operations are reversed. First, the low temperature theremostat 30 regulates the flow of oil through the valve 42 of the pump 10 and the corresponding air flow through the valves 15 and 22, gradually diminishing the same until, at 30°, they are shut down entirely, whereupon it opens the switch 45 shutting off the motor 19 and stopping the pump 10. Then, the thermostat 29, which has been full "on" during all this time, gradually reduces the openings of valves 42, 15 and 22 of the pump 9, until, at 60°, all are completely closed; and finally the clutch 18 is released and the switch 44 is opened, shutting off the entire apparatus.

If it should happen that the pump 9 fails while the pump 10 is idle, the cessation of pressure in the pipe 35 will cause the rod 28 of the diaphragm 26 to move into its extreme position to the right, due to the collapsing of the diaphragm. In so doing, the slot in the rod 28 will engage the pivot pin of the segment 25, thus moving the segment 25 and the lever 23 to their starting positions, thereby opening the clutch 18 and stopping the pump 9. At the same time, the cessation of pressure in the pipe 51 will, through the lever 49 and link 48, close the switch 47, thereby starting the pump 10, the pressure of which, communicated through the pipe 36 to the diaphragm 27, will open wide the controls of the pump 10, the movement of the cord 60 with the movement of the lever 49 having released the catch 58 and locked the segment 25 and lever 24 to the forward or right hand end of the slot in the rod 28, and the clamp 54 and slot 53 in the rod 31 permitting the levers 32 and 40 to move into the "on" position without disturbing the thermostat 30 which will remain at its high temperature setting. As long as there is pressure in the pipe 36, that is, as long as the pump 10 is working, the controls of the pump 10 will remain open until the pump 9, after being repaired, is restarted. Upon restarting the pump 9, the pressure in the pipes 43 and 51, by actuating the differential pressure device 50, opens the switch 47 and thus stops the motor 19 and the pump 10, so that, by cessation of pressure in the pipe 36, the diaphragm 27 will close the controls of the pump 10; and after the catch 58 has been reset by the repair man, the pump 10 is again ready to automatically start when needed, either upon another failure of the pump 9, or upon a drop of temperature below 30°.

When both pumps of such a two-unit pump arrangement are running and the pump 9 gets out of order, so that the pressure in the pipe 35 ceases or is reduced below the limit for which the diaphragm 26 is set, the rod 28 of the latter, by the collapse of the diaphragm, pulls the right hand gear segment 25 into the dotted line position shown in Fig. 2, thereby closing the right hand outlet valve 15 and moving the shift lever 23 which closes the right hand inlet valve 22 and, through the rod 38, opens the clutch 18, thereby stopping the pump 9. If the pump 10 should fail while both pumps are running, the cessation of pressure in the pipe 36 will cause the diaphragm 27 to close the left hand air valves.

By omitting the thermostats and their controls only, but retaining the pressure controlled switch 47, in the circuit of the motor 19 and using a hand controlled switch in place of the thermostat switch 44, an automatic two-unit reserve pump device is running at a time, the main pump being automatically shut off and stopped, and the auxiliary pump substituted in case of failure of the former. To operate this device, the starting switch of the motor 17 is closed and the clutch 18 of the pump 9 is thrown into engagement.

In case only the pump 9 of the two-unit reserve pump device is running, its failure, through cessation of pressure in the pipe 35 will operate the diaphragm 26, thereby closing the right hand air valves and opening the clutch 18, as before, and, through cessation of pressure in the pipes 43 and 51, will actuate the differential pressure device 50, thereby closing the switch 47 and starting the motor 19 of the pump 10. Pressure being thus set up in the pipe 36, the diaphragm 27 is actuated, whereby the controls of the pump 10 are opened wide. Upon reinstatement of the pump 9, the pressure in the pipes 43 and 51 automatically stops the pump 10 and, by the subsequent action of the diaphragm 27, the controls are reclosed.

What is claimed is:

1. The combination with a furnace, of a blower, an air conduit leading from said blower to said furnace, a plurality of pumps and operative connections for forcing oil to said furnace, and means for automatically controlling the number of pumps in action in accordance with predetermined conditions, said means including operative connections, a plurality of sets of inlet and outlet valves associated with said blower, and a plurality of sets of gearing for independently actuating said sets of valves and for simultaneously actuating the valves of each set.

2. The combination with a furnace, of a blower, an air conduit leading from said blower to said furnace, a plurality of pumps and operative connections for forcing oil to said furnace, and means for automatically controlling the number of pumps in action in accordance with predetermined conditions, said means including operative connections and a plurality of independently-operative actuating devices for said connections each comprising a bellows diaphragm actuated by pressure derived from one of said pumps and a thermostat actuated by the atmosphere.

3. The combination with a furnace, of a blower, an air conduit leading from said blower to said furnace, a plurality of pumps and operative connections for forcing oil to said furnace, and means for automatically controlling the number of pumps in action in accordance with predetermined conditions, said means including operative connections and a bellows diaphragm actuated by pressure derived from one of said pumps and actuating said connections.

4. The combination with a furnace, of a blower, an air conduit leading from said blower to said furnace, a plurality of pumps and operative connections for forcing oil to said furnace, and means for automatically controlling the number of pumps in action in accordance with predetermined conditions, said means including operative connections, a bellows diaphragm actuated by pressure derived from one of said pumps, and valves controlling passage of air through said conduit and actuated by said diaphragm.

5. The combination with a furnace, of a blower, an air conduit leading from said blower to said furnace, a plurality of pumps and operative connections for forcing oil to said furnace, and means for automatically controlling the number of pumps in action in accordance with predetermined conditions, said means including operative connections, a thermostat actuated by the atmosphere, and valves controlling passage of air through said conduit and actuated by said thermostat.

6. The combination with a furnace, of a blower, an air conduit leading from said blower to said furnace, a plurality of pumps and operative connections for forcing oil to said furnace, and means for automatically controlling the number of pumps in action in accordance with predetermined conditions, said means including operative connections, a bellows diaphragm actuated by pressure derived from one of said pumps, a thermostat actuated by the atmosphere, and valves controlling passage of air through said conduit and actuated by said diaphragm and by said thermostat.

7. The combination with a furnace, of a blower, an air conduit leading from said blower to said furnace, a plurality of pumps and operative connections for forcing oil to said furnace, and means for automatically controlling the number of pumps in action in accordance with predetermined conditions, said means including operative connections, a bellows diaphragm actuated by pressure derived from one of said pumps, and pump starting means actuated by said diaphragm.

8. The combination with a furnace, of a blower, an air conduit leading from said blower to said furnace, a plurality of pumps and operative connections for forcing oil to said furnace, and means for automatically controlling the number of pumps in action in accordance with predetermined conditions, said means including operative connections, a bellows diaphragm actuated by pressure derived from one of said pumps, a thermostat actuated by the atmosphere, and pump starting means actuated by said diaphragm and by said thermostat.

In testimony whereof, I have signed my name to this specification.

WILFORD J. HAWKINS.